(12) United States Patent
Baron

(10) Patent No.: US 7,106,369 B2
(45) Date of Patent: Sep. 12, 2006

(54) CONTINUOUS AUDIO CAPTURE IN AN IMAGE CAPTURING DEVICE

(75) Inventor: John M. Baron, Longmont, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1028 days.

(21) Appl. No.: 09/932,809

(22) Filed: Aug. 17, 2001

(65) Prior Publication Data

US 2003/0035055 A1    Feb. 20, 2003

(51) Int. Cl.
 *H04N 5/76* (2006.01)

(52) U.S. Cl. .................................................. 348/231

(58) Field of Classification Search ........... 348/231.99, 348/231.3, 231.2, 231.4
See application file for complete search history.

(56) References Cited

U.S. PATENT DOCUMENTS

| 4,905,029 A | 2/1990 | Kelley |
| 4,983,996 A | 1/1991 | Kinoshita |
| 5,099,262 A | 3/1992 | Tanaka et al. |
| 5,128,700 A | 7/1992 | Inoue et al. |
| 5,276,472 A | 1/1994 | Bell et al. |
| 5,389,989 A | 2/1995 | Hawkins et al. |
| 5,489,955 A | 2/1996 | Satoh et al. |
| 5,721,992 A | 2/1998 | Chovanes |
| 5,771,414 A | 6/1998 | Bowen |
| 5,784,525 A | 7/1998 | Bell |
| 5,815,316 A * | 9/1998 | Friedman et al. ............ 359/511 |
| 5,899,956 A * | 5/1999 | Chan ........................... 701/213 |
| 6,075,950 A | 6/2000 | Stephenson |
| 6,078,758 A | 6/2000 | Patton et al. |
| 6,102,505 A | 8/2000 | McIntyre et al. |
| 6,163,656 A | 12/2000 | Yoshioka |
| 6,179,208 B1 | 1/2001 | Feng |
| 6,449,540 B1 * | 9/2002 | Rayner ......................... 701/35 |
| 6,570,621 B1 * | 5/2003 | Bigler et al. ................. 348/372 |
| 2004/0027480 A1 * | 2/2004 | Hamamura .................. 348/371 |

FOREIGN PATENT DOCUMENTS

JP  11-55615  * 2/1999

* cited by examiner

*Primary Examiner*—Tuan Ho

(57) ABSTRACT

An image capturing device comprises an audio transducer, a processor, and a memory. The memory receives an audio signal produced by the audio transducer and gated by the processor. The memory includes an audio buffer capable of continuously accumulating the audio signal until the buffer becomes full, and thereafter storing a predetermined time amount of the most recent audio signal. The memory further includes one or more audio storage cells capable of storing at least a portion of the audio signal held in the audio buffer. The processor is capable of storing at least a portion of the audio signal from the audio buffer into an audio storage cell of the one or more audio storage cells.

17 Claims, 3 Drawing Sheets

CONTINUOUS AUDIO CAPTURE IN AN IMAGE CAPTURING DEVICE

FIELD OF THE INVENTION

The present invention relates generally to an audio capture function in an image capturing device, and more particularly to a continuous audio capture in an image capturing device.

BACKGROUND OF THE INVENTION

Still image capturing devices are used to visually memorialize scenes, events, or items. Still image capturing devices, such as cameras, include a lens, a shutter, and either a photosensitive film or an electronic image sensor. In addition, most modern cameras include a processor and/or other control electronics that function to control shutter speed, aperture, flash, focus, etc.

It has become increasingly common in image capturing devices to also capture a small audio sequence associated with an image. By capturing audio along with an image, an image capturing device may preserve voices, music, laughter, etc. to enhance the enjoyment of a captured image. This may be very desirable to the user of the image capturing device. In addition, an audio recording may be easily and efficiently used to record data about the captured image, such as date, occasion, people in the image, etc.

In the prior art, an image capturing device typically included audio apparatus that is triggered upon an image capture, i.e., upon a press of a shutter button or upon some other manual input by the user. Therefore, in order to capture audio according to the prior art, the user must press a button and generally gets a fixed audio recording captured over a fixed time period. Often, a separate button is provided to perform audio recording. Recording continues as long as the button is pressed (subject to a time limit), but this can only be done after the image is captured.

The audio capture according to the prior art has several drawbacks. It is either linked to an image capture or is dependent on foresight and preparation by the user. In the prior art approach the user must enable the audio capture at a desired time. This is unfortunate, as a sound may trigger a desire to capture an image (and the associated audio). For example, a child's laugh may trigger a desire to capture both an image and the laugh. This is not possible in the prior art.

Therefore, there remains a need in the art for improvements in image capturing devices with audio capture capability.

SUMMARY OF THE INVENTION

An image capturing device comprises an audio transducer, a processor, and a memory. The memory receives an audio signal produced by the audio transducer and gated by the processor. The memory includes an audio buffer capable of continuously accumulating the audio signal. The memory further includes one or more audio storage cells capable of storing at least a portion of the audio signal held in the audio buffer. The processor is capable of storing at least a portion of the audio signal from the audio buffer into an audio storage cell of the one or more audio storage cells.

DETAILED DESCRIPTION

Figure 1:
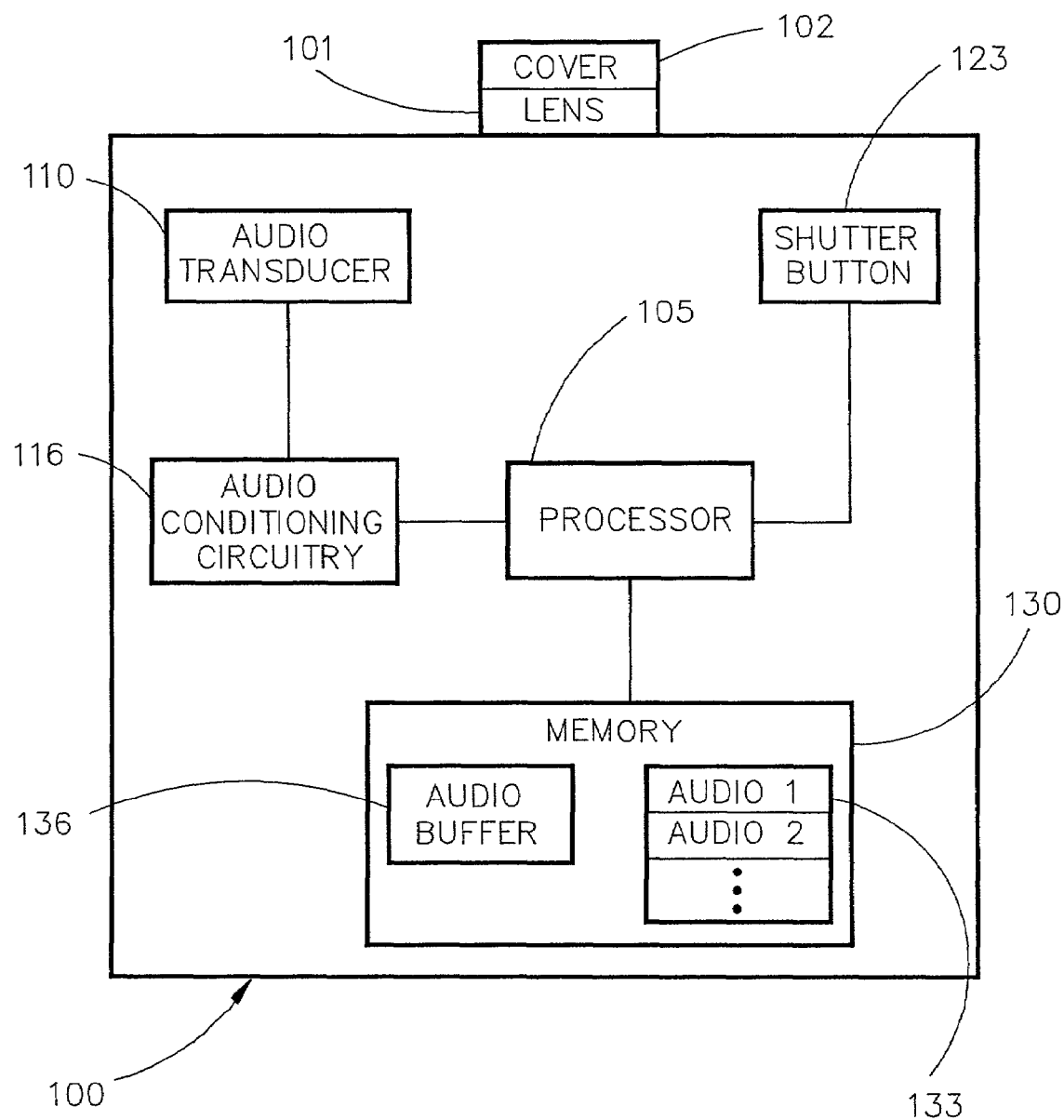
FIG. 1 is a schematic diagram of an image capturing device according to one embodiment of the invention.

FIG. 1 is a schematic diagram of an image capturing device 100 according to one embodiment of the invention. The image capturing device 100 includes a lens apparatus 101, an optional lens cover 102, a processor 105, an audio transducer 110, an optional audio conditioning circuit 116, a shutter button 123, and a memory 130.

The processor 105 may be any type of general purpose processor. The processor 105 executes a control software program contained in the memory 130. In addition, the processor 105 receives inputs and controls the overall operation of the image capturing device 100. The processor 105 may optionally include an analog-to-digital converter (A/D) that converts a received audio signal into a digital audio signal.

The shutter button 123 may be employed by a user to perform an image capture operation. In addition, the shutter button 123 may be used in combination with other input devices in order to select modes and control operation of the image capturing device 100.

The audio transducer 110 may be any type of audio transducer capable of converting sound into a representative electrical audio signal. The audio transducer 110 may be a microphone, for example.

The optional audio conditioning circuit 116 may be included if audio signal processing between the audio transducer 110 and the processor 105 is required. Therefore, the optional audio conditioning circuit 116 may include any type of audio processing circuitry as is known in the art, such as amplification, filtering, etc. In addition, the audio conditioning circuit 116 may include an A/D converter that converts an analog electrical signal from the audio transducer 110 into a representative digital audio signal. The resultant digital audio signal may be received by the processor 105 and relayed to the memory 130, or may be directly gated into the memory by the processor 105.

The memory 130 may be any type of memory, including all types of random access memory (RAM), flash memory, magnetic storage media such as magnetic disc, tape, etc., or optical or bubble memory. The memory 130 may include, among other things, an audio buffer 136 and one or more audio storage cells 133. In addition, if the image capturing device 100 is a digital image capturing device, the memory 130 may store digital images (not shown). Furthermore, the memory 130 may store a software program to be executed by the processor 105.

The audio buffer 136 may continuously store a predefined length of a received digital audio signal gated by the processor 105 when the image capturing device 100 is in an audio capture mode. The audio buffer 136 therefore may contain a predetermined time segment of the (captured) audio signal. The predetermined time segment may be 30 seconds of captured audio, for example. However, it should be understood that the predetermined time segment may be of any time length, and is limited only by the amount of memory the designer wishes to dedicate to this purpose.

The processor 105 gates the audio signal and therefore allows the audio signal into the audio buffer 136 when the image capturing device 100 is in the audio capture mode. The processor 105 may gate the audio signal by controlling the making or breaking of an audio path (i.e., switching).

Alternatively, the processor 105 may gate the audio signal by receiving and selectively relaying it to the memory 130. In another alternative, the processor 105 may control the supply of electrical power to the audio transducer 110, if the audio transducer 110 is an active device.

The audio buffer 136 may continuously accumulate a predefined time amount of the audio signal during the audio capture mode. The audio capture mode may be enabled whenever the lens cover 102 has been opened and the lens apparatus 101 is exposed, for example. Alternatively, the audio capture mode may enable whenever the image capturing device 100 is powered on, such as through a camera power switch. In yet another alternative, the audio capture mode may be enabled whenever the shutter button 123 is partially depressed; such as in image capturing devices that have a two-stage shutter button 123 that may be partially depressed in order to perform a focus and/or flash measurements.

The one or more audio storage cells 133 may store all or part of the digital audio signal contained in the audio buffer 136. Therefore, when the user of the image capturing device 100 desires to capture audio at some point in time at or near an image capture, the user may specify that the contents of the audio buffer 136 be copied to one of the audio storage cells 133. In this manner, the user does not have to worry about setting up or causing an audio capture. This enables a user to capture audio (along with an image) without having to plan to do so beforehand, and may allow the user to do so even after the image capture has occurred. Due to circumstances surrounding an image capture, the user may not have had the forethought to enable an audio capturing mode, as is necessary in the prior art. Moreover, the user may select a portion of an audio signal to be stored. Therefore, if the image capturing device 100 captures 30 seconds of audio, for example, the user may select and store only a portion. This may be a portion captured before, during, or after the associated image capture.

Figure 2:
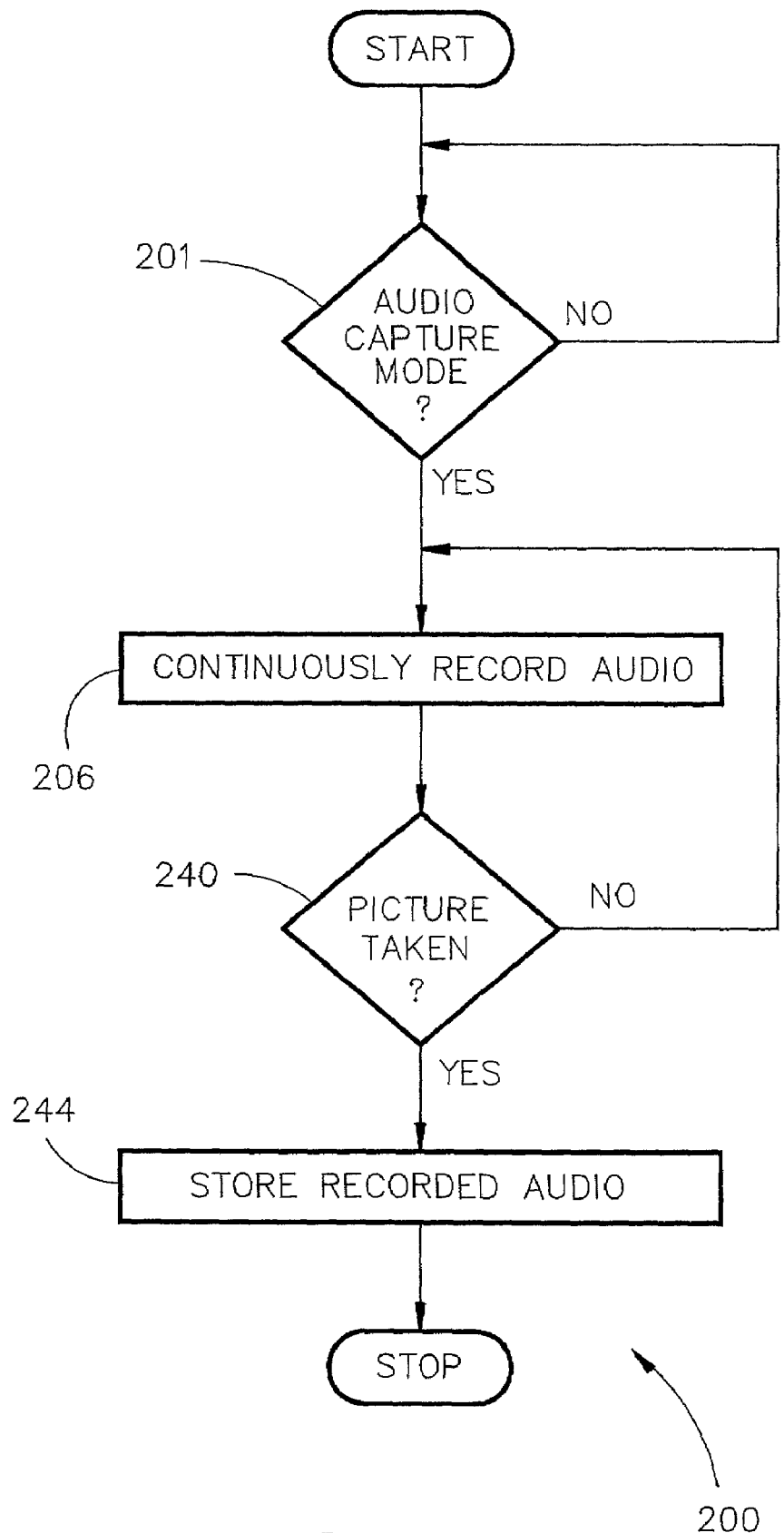
FIG. 2 is a flowchart of an audio capture method according to another embodiment of the invention.

FIG. 2 is a flowchart 200 of an audio capture method according to another aspect of the invention. In step 201, the image capturing device 100 determines whether it is in an audio capture mode. This may include monitoring a lens cover position, monitoring a power switch or power state, etc. If it is not, the method does not proceed. Otherwise, it proceeds to step 206.

In step 206, an audio signal is continuously recorded into the audio buffer 136. This is continuously done during an audio capture mode. The audio signal is continuously stored in the buffer until the buffer is full. Thereafter, the signal is overwritten from the beginning of the buffer, such as in a first-in, first-out shift operation.

In step 240, the image capturing device 100 determines whether an image has been captured (i.e., a press of the shutter button 123, for example).

In step 244, after a picture has been taken, the image capturing device 100 stores at least a portion of the recorded audio into an audio storage cell 133. This may include transferring all or part of the audio buffer 136 to an audio storage cell 133. In this manner, the user of the image capturing device may automatically capture and record audio around an image capture time. In a digital image device, the audio signal is stored with an address of the corresponding stored image, or the image may be stored with the address of the corresponding audio signal.

Figure 3:
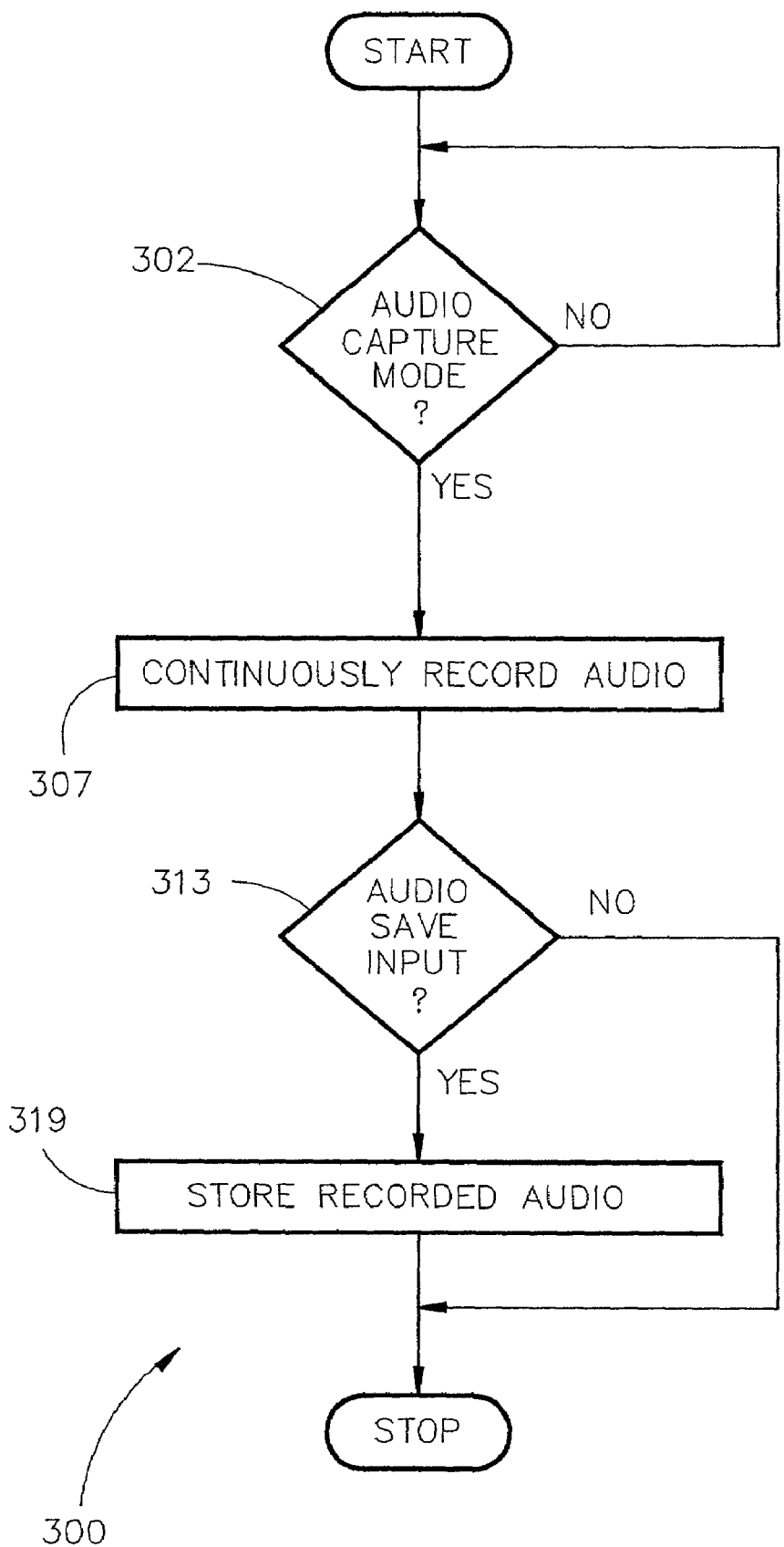
FIG. 3 is a flowchart of an audio capturing method according to yet another embodiment of the invention.

FIG. 3 is a flowchart 300 of an audio capturing method according to yet another embodiment of the invention. In step 302, the image capturing device 100 determines whether it is in an audio capture mode, as previously discussed.

In step 307, an audio signal is continuously recorded, as previously discussed.

In step 313, a store command input is detected. This may be some manner of input by the user. For example, an image capturing device may include an audio store button or may include a user interface that displays menus or list of commands among which the user may choose, including an audio store command. In addition, the user may optionally enter a command that specifies only a portion of the audio buffer 136 be transferred and recorded. Alternatively, the store input command may be configured so that it is automatically issued in conjunction with an image capture. In another alternative embodiment, the store input command may be issued a predetermined delay time period after the image capture. If the store command input is detected, the method proceeds to step 319. Otherwise, it exits.

In step 319, the recorded audio is stored. As previously discussed, this comprises copying all or part of the digital audio signal from the audio buffer 136 to an audio storage cell 133. In this manner, the user may store audio before, during, or after an image capture.

I claim:

1. An image capturing device for capturing still images, wherein the image capturing device can be placed in an audio capturing mode, comprising:
    a two-stage shutter button;
    an audio transducer capable of converting sound into a representative electrical audio signal;
    a processor communicating with said audio transducer and selectively causing said audio signal to be outputted by said audio transducer, said processor being coupled to the shutter button; and
    a memory for receiving said audio signal, said memory including an audio buffer capable of continuously storing a predetermined amount of said audio signal and including at least one audio storage cell capable of storing at least a portion of said audio signal held in said audio buffer, wherein
    as a result of the image capturing device being placed in the audio capture mode, said processor causes said audio signal to be continuously stored in said audio buffer,
    in response to the user of the image capturing device partially depressing the shutter button, said processor performs a lens focusing and/or flash measurement, and
    in response to a user of the image capturing device fully depressing the shutter button, said processor causes at least a portion of said audio signal from said audio buffer to be stored into said at least one audio storage cell and causes the device to capture and store a still image.

2. The device of claim 1, further comprising an audio conditioning circuit that performs audio signal processing on said audio signal.

3. The device of claim 1, wherein the image capturing device is automatically placed in the audio capture mode as a result of the user partially depressing the shutter button.

4. The device of claim 1, further comprising a lens and a cover for covering the lens so that the lens is not exposed, wherein the image capturing device is automatically placed in the audio capture mode as a result of said cover being disposed in a position wherein the cover is not covering the lens.

5. The device of claim 1, further comprising a power switch, having an on position and an off position, for powering the image capturing device on and off, wherein the image capturing device is automatically placed in the audio capture mode as a result of the power switch being placed in the on position.

6. The device of claim 1, wherein said processor stores said at least a portion of said audio signal upon a user input.

7. The device of claim 1, wherein said processor stores said at least a portion of said audio signal upon a user input, and wherein said user input is not constrained to occur simultaneously wit an image capture.

8. The device of claim 1, wherein said processor stores said at least a portion of said audio signal upon a user input, and wherein said user input specifies a portion of said audio signal to be stored, wherein said portion of the audio signal is less than the audio signal stored in the buffer.

9. The device of claim 1, wherein in response to the user fully depressing the shutter button, said processor immediately causes at least a portion of said audio signal from said audio buffer to be stored into said at least one audio storage cell.

10. The device of claim 1, wherein in response to the user fully depressing the shutter button, said processor waits for a predetermined amount of time before causing at least a portion of said audio signal from said audio buffer to be stored into said at least one audio storage cell.

11. An audio capture method in an image capturing device having a shutter button, wherein the image capturing device can be placed in an audio capture mode, comprising the steps of:

activating the audio capture mode in response to a user of the image capturing device exposing the lens by moving a lens cover that was covering the lens;

continuously storing an audio signal in an audio buffer in said image capturing device only when said image capturing device is in the audio capture mode; and storing at least a portion of said audio signal upon a store command input from the user.

12. The method of claim 11, further comprising a preliminary step of converting sound into said audio signal.

13. The method of claim 11, wherein said store command input comprises a store command input unassociated with any image capture function.

14. The method of claim 11, wherein said store command input is issued automatically in conjunction with an image capture function.

15. The method of claim 11, wherein said store command input is not constrained to occur simultaneously with an image capture.

16. The method of claim 11, wherein the step of storing at least a portion of said audio signal upon the store command input from the user occurs immediately in response to receipt of the store command.

17. The method of claim 11, wherein the step of storing at least a portion of said audio signal upon the store command input from the user occurs a predetermined amount of time after receipt of the store command.

* * * * *

UNITED STATES PATENT AND TRADEMARK OFFICE
CERTIFICATE OF CORRECTION

PATENT NO.        : 7,106,369 B2                                              Page 1 of 1
APPLICATION NO.   : 09/932809
DATED             : September 12, 2006
INVENTOR(S)       : John M. Baron It is certified that error appears in the above-identified patent and that said Letters Patent is hereby corrected as shown below:

In column 5, line 12, in Claim 7, delete "wit" and insert -- with --, therefor.

Signed and Sealed this

Fifth Day of May, 2009

JOHN DOLL
*Acting Director of the United States Patent and Trademark Office*